United States Patent

[11] 3,607,028

[72] Inventors Alfred Schmidt;
Ferdinand Weinrotter; Walter Muller;
Walter Bohler, all of Linz/Donau, Austria
[21] Appl. No. 784,797
[22] Filed Dec. 18, 1968
[45] Patented Sept. 21, 1971
[73] Assignee Osterreichische Stickstoffwerke
Aktiengesellschaft
Linz/Donau, Austria
[32] Priority Dec. 27, 1967
[33] Austria
[31] A11659/67

[54] PROCESS FOR THE PRODUCTION OF THE DINITROGEN TETROXIDE
4 Claims, 1 Drawing Fig.

[52] U.S. Cl. ................................................................. 23/157
[51] Int. Cl. ............................................................ C01b 21/36
[50] Field of Search ........................................... 23/157, 160–161

[56] References Cited
UNITED STATES PATENTS
| | | | |
|---|---|---|---|
| 3,063,804 | 11/1962 | Morrow | 23/157 X |
| 3,136,602 | 6/1964 | Berger | 23/162 |
| 3,421,854 | 1/1969 | Smith et al. | 23/157 X |

*Primary Examiner*—Oscar R. Vertiz
*Assistant Examiner*—G. O. Peters
*Attorney*—Wenderoth, Lind & Ponack

ABSTRACT: Dinitrogen tetroxide is produced by a catalytic oxidation of ammonia with air at atmospheric pressure followed by oxidation of the resultant nitrogen oxides by 50 to 70 percent $HNO_3$. This increases the concentration of $NO_2$ and results in formation of dilute $HNO_3$. The $NO_2$ is cooled and condensed by compression to at least four atmospheres at temperatures not below 8° C. to produce dinitrogen tetroxide in liquid phase and nitrogen dioxide in vapor phase. The latter is reacted with an excess of oxygen in the presence of the dilute nitric acid in the preceding step to produce nitric acid of 50 to 70 percent concentration which may be recycled to the step wherein the nitric oxide is oxidized by nitric acid. By the present process, the use of expensive and difficult-to-operate nitric acid concentrators is avoided.

PATENTED SEP 21 1971
3,607,028
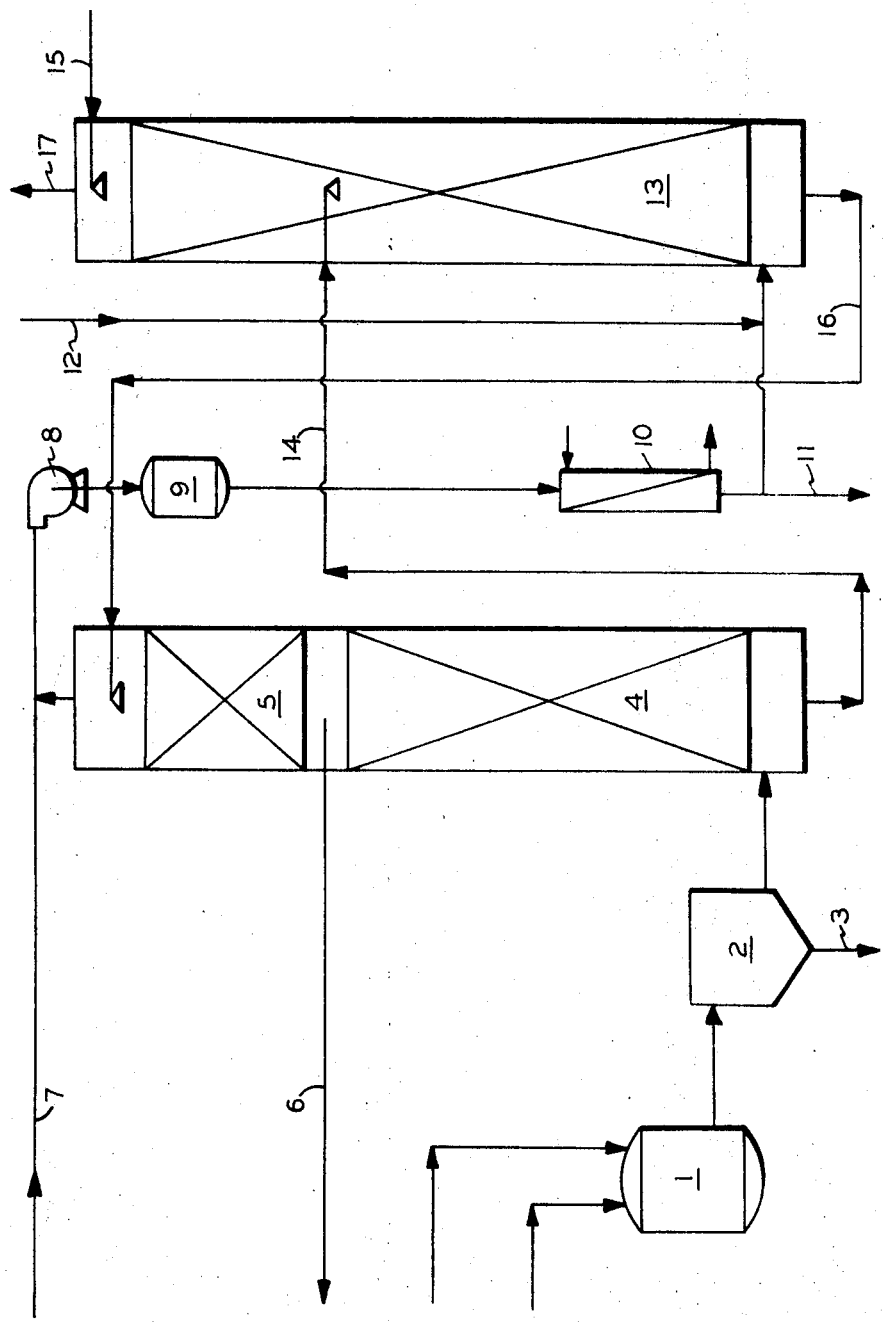
INVENTORS
ALFRED SCHMIDT
FERDINAND WEINROTTER
WALTER MÜLLER
WALTER BOHLER
BY, Wenderoth, Lind & Ponack
ATTORNEYS

PROCESS FOR THE PRODUCTION OF THE DINITROGEN TETROXIDE

This invention relates to an improved process for the production of dinitrogen tetroxide.

It is known, in the production of dinitrogen tetroxide from the gases arising from the combustion of ammonia at atmospheric or superatmospheric pressure, to oxidize the nitrogen oxide constituents which, after the combustion of the ammonia, are still present as NO, not with air but with 50 to 68 percent strength nitric acid at slightly elevated temperature and normal pressure, whereupon the entire nitrogen dioxide present is then, after compression, absorbed by washing with 85 to 95 percent strength nitric acid in countercurrent and is obtained therefrom by distillation and condensation. The dilute nitric acid remaining in the oxidation stage must either be mixed with concentrated nitric acid or be concentrated by evaporation in order to make it usable for return to the oxidation step.

The disadvantage of the above process resides in the necessity of handling large quantities of concentrated nitric acid. The corrosive nature of this acid is known to be exceptionally high so that special constructional materials must be employed. Apart from this the process demands that large quantities of nitric acid constantly have to be cooled to low temperatures, subsequently heated and again cooled, and this requires a considerable expenditure of energy.

It has also been proposed to allow the NO containing nitrogen dioxide, which is produced on combustion of ammonia under pressure and which has been cooled to a temperature of about 350° C., to react, whilst maintaining the pressure of the ammonia combustion, with cold approximately 60 percent strength nitric acid with the formation of $NO_2$, in the course of which a temperature of the issuing gases of 90° to 120° C. is established. The gas mixture resulting therefrom is cooled in two stages, with the content of approximately 50 percent strength nitric acid first being removed by condensation and the $N_2O_4$ then being obtained in a liquid form whilst cooling to −90° C. and maintaining the pressure of the nitric acid oxidation. The approximately 50 percent strength nitric acid produced as a byproduct must be reconcentrated in the usual manner and returned to the process as 60 percent strength acid unless it can be employed for other purposes, for example for the manufacture of ammonium nitrate, whilst the gas remaining after separating off the $N_2O_4$, which still contains considerably quantities of $NO_2$, can only be employed in simultaneous manufacture of nitric acid. This means that the utilization of the byproducts depends upon other production plants or that, to the extent that a different utilization of the 50 percent strength nitric acid is not possible, the latter must be concentrated by distillation, which means considerably economic expenditure.

It has now been found that in the production of $N_2O_4$ from the reaction gases of the combustion of ammonia with air under normal pressure, both the handling of concentrated nitric acid and the evaporation of dilute nitric acid can be avoided if in the cooling required after the compression only cooling water at normal ambient temperature is employed. The result of this is that the uncondensed gas mixture thereupon produced is still so rich in $NO_2$ that concentration of the dilute nitric acid also arising as a byproduct may be raised to the strength required for the reaction with NO so that complete utilization of the byproduct within the framework of the manufacture of $N_2O_4$ has become possible.

Accordingly the present invention provides in a process for the production of dinitrogen tetroxide by the combustion of ammonia with air at atmospheric pressure in the presence of a catalyst, oxidation of the resulting gas mixture, containing NO and a small quantity of $NO_2$, at an elevated temperature by means of nitric acid having a concentration of 50 to 70 percent by weight and subsequent isolation of $N_2O_4$ by compression of the gas mixture and cooling, the improvement which comprises compressing the gas mixture to a pressure of at least 4 atmospheres absolute, preferably 6 to 10 atmospheres absolute while cooling to a temperature not below 8° C., preferably at 15° to 30° C., withdrawing part of the $NO_2$ as liquid $N_2O_4$, supplementing the oxygen content of the gas mixture containing the residual $NO_2$ in the gas phase by admixing air until the mixture has an oxygen content which at least corresponds to the amount stoichiometrically required for the formation of $N_2O_5$ from $NO_2$, treating the resulting gas mixture with the dilute nitric acid originating from the nitric acid oxidation, with concentration of the acid, until a nitric acid of 50 to 70 percent strength is obtained, and recycling at least part of the resulting concentrated acid to the oxidation stage.

If the amount of air used in the combustion of ammonia is so chosen that in the main the oxidation stage of NO is reached and only small quantities of $NO_2$ are produced at the same time, then the partial pressure of the $NO_2$ or $N_2O_4$ in the final gas mixture can be kept so high that production of $N_2O_4$ by compression and cooling leads to yields which can be accepted in practice. This results in good utilization of the nitric acid oxidation stage which in turn contributes to increasing the partial pressure of $NO_2$ in the reaction gas, since according to the equation $2\ HNO_3 + NO \rightarrow 3\ NO_2 + H_2O$ 2 mols of $NO_2$ are freshly formed from the nitric acid per mol of the nitrogen monoxide originating from the ammonia combustion. The extent of the subsequent compressions, which should amount to at least 4 atmospheres absolute, must be made dependent on which cooling temperature is chosen for the condensation. Whilst at compression to 4 atmospheres absolute, a cooling temperature of 8° C. is necessary in order to obtain an appropriate yield of $N_2O_4$, a temperature 17° C. suffices at a pressure of 6 atmospheres absolutes, of 24° C. at 8 atmospheres absolute and even a temperature of 30° C. at 10 atmospheres absolute. Appropriately, a preferred compression to 6 to 10 atmospheres absolute should be maintained and the mixture cooled to an appropriate temperature between 15° and 30° C., since here particularly favorable relationships between compression and cooling temperature prevail.

Since, in the combustion of $NH_3$, an excess of air should if possible be avoided, it is necessary that before dissolving the $NO_2$ remaining in the gas in the dilute nitric acid originating from the oxidation, this acid being produced at about 30 percent strength, the amount of oxygen in the form of air should be supplied which is necessary for the formation of $N_2O_4$ from $NO_2$. In this way the nitric acid required for the oxidation is produced in the process and is recycled.

Because of the chemical equilibrium involved it is not possible entirely to oxidize the NO with $HNO_3$ to $NO_2$. The oxidation of the residual NO may take place after admixture of some air, this air being appropriately admixed with the gases immediately after issuing from the column serving for the nitric acid oxidation, and this is above all advisable if the $N_2O_4$ is to be particularly pure, that is to say if a low $N_2O_3$ content is not tolerated. It is therefore then necessary to provide for an appropriate residence time of the gas after the compression and before the cooling of the gases, say by passing through a chamber of an appropriate volume. The air required for the remaining oxidation should however appropriately not amount to more than 10 percent of the volume of the ammonia-air mixture which has been employed for the combustion of ammonia.

The extent to which the nitric acid produced in the last stage of the process from the $NO_2$ and the dilute approximately 30 percent balance of the process. Thus, first of all, water is produced by the combustion combustion of ammonia, and this can be left in the gas mixture leading to an excess consumption of $NO_2$ in order to achieve the necessary concentration of the nitric acid. However even if this water is at least largely separated off by condensation before the NO present in the gas is oxidized to $NO_2$ with nitric acid, excess water is produced in the course of the process. Admittedly 1 mol of water is produced per 3 mols of $NO_2$ in the oxidation of the NO with nitric acid whilst in the reformation of nitric acid from $NO_2$ 1 mol of water is consumed per 2 mols of $NO_2$, but on the other hand a significant part of the $NO_2$ is removed from the system in the form of N₂O₄ and water is necessary for the final gas wash, so that an excess of water ultimately produced. This excess must be withdrawn from the process in the form of nitric acid, and this is appropriately done by withdrawing an appropriate amount of nitric acid to regulate the water balance, appropriately at a point at which the nitric acid has already suffered a slight dilution by the oxidation reaction. This has the advantage that an acid of the usual concentration, which can be used for the most diverse purposes is thereby obtained.

The process of the invention will be particularly described with reference to the accompanying drawing.

In this drawing 1 denotes the reactor for the ammonia combustion, coupled to a steam kettle. The gas mixture leaving this reactor is freed, in a water separator 2, from water which issues at 3 in liquid phase. The gas mixture is then passed into an oxidation column 4, 5 divided into two zones, at the head of which the nitric acid required for the oxidation, and of the appropriate concentration, is charged and passed in countercurrent to the ascending gases. The amount of nitric acid of medium concentration which is needed to remove the excess water is withdrawn via the pipeline 6 lying between the upper part 5 and the lower part 4 of the oxidation column. The gas mixture issuing at the head of the column 4, 5 is mixed with the air required for the remaining oxidation from the pipe 7. The mixture is then compressed in a compressor 8 and, after passing through a chamber 9 for the remaining oxidation, is cooled in a condenser 10, so that liquid N₂O₄ can be removed at 11. The gas mixture leaving the condenser 10 is again mixed with air from pipe 12 and introduced into the sump of a column 13, preferably a packed column serving to concentrate the nitric acid. The dilute nitric acid which had been withdrawn at the foot of the oxidation column 4, 5 is introduced into approximately the lower part of the upper half of the column 13, through pipe 14, and passed in countercurrent to the gases containing N₂O₅ ascending in this column. Some more water is charged at 15 in order to wash out the residual amounts of NO₂ and/or N₂O₅ A waste gas consisting essentially of N₂ and O₂ issues at the head of this column at 17, whilst the concentrated nitric acid issuing at the foot of the column is returned to the oxidation column via the pipeline 16.

EXAMPLE

The combustion furnace 1 is charged hourly with a mixture of 90 90 kmol of ammonia, 132 kmol of oxygen and 498 kmol of nitrogen. The ammonia is mainly burnt to NO in this furnace, using platinum-rhodium nets as the catalyst. The gas mixture leaving the furnace 1 is cooled to about 50° C. in the water separator 2, in the course of which 75 kmol of water are withdrawn hourly in the liquid phase. The gas mixture leaving the water separator which is at a temperature of about 50° C. consists of 10.2 kmol of O₂, 498 kmol of N₂, 72 kmol of NO and 18 kmol of NO₂. This gas is charged at the foot of the oxidation column 4, a packed column, is oxidized at 50° C. with 68 percent strength nitric acid charged at the head of the column and running in counter current. 118.3 kmol of 60 percent strength nitric acid are withdrawn in the upper half of this oxidation column 5, through pipe 6, corresponding to a withdrawal of water of 82.2 kmol per hour. The gas mixture leaving the head of the column 4, 5 has the composition of 10.2 kmol of O₂, 498 kmol of N₂, 27 kmol of NO and 153 kmol of NO₂. It is mixed with air corresponding to 10.2 kmol of O₂ and 385 kmol of N₂ and condensed at 7 atmospheres absolute in the compressor 8. After passing through the chamber 9 for the purpose of the remaining oxidation, in which chamber it remains for about 30 seconds, and after cooling the mixture by means of cooling water to 21° C. liquid N₂O₄ corresponding 54.6 kmol of NO₂ is withdrawn from the condenser 10 at 11.

The gas phase, having a residual NO₂ content of 125.4 kmol and an O₂ content of 7 kmol per hour is mixed with air so that the oxygen content is raised to 43 kmol. This gas is introduced into the sump of the packed column 13 which is treated with 324 kmol of 32 percent strength nitric acid through pipe 14. The reaction temperature is 15°to 25° C. After using 39.5 kmol of water per hour 425.5 kmol of 68 percent strength nitric acid, which is returned to the oxidation column 5, 4, are obtained alongside a waste gas which is practically free of nitric oxide.

The same yields of liquid N₂O₄ and 68 percent strength HNO₃ are obtained if a temperature of t° C. is chosen for a compression of $p$ atmospheres absolute in accordance with the following table:

| P | t |
|---|---|
| atmospheres absolute | ° C. |
| 4 | 8 |
| 5 | 13 |
| 6 | 17 |
| 7 | 21 |
| 8 | 24 |
| 9 | 27 |
| 10 | 30 |

However, other combinations of pressure and temperature, for example the choice of a lower temperature for the pressure $p$ than that given in the table, are also possible if the nitrogen tetroxide yield is to be increased. In such cases it is under certain circumstances necessary to supplement a possible shortage of 68 percent strength nitric acid by fresh concentrated nitric acid.

We claim:

1. In a process for the production of dinitrogen tetroxide by the combustion of ammonia with air at atmospheric pressure in the presence of a catalyst, oxidation of the resulting gas mixture, containing NO and a small quantity of NO₂, at an elevated temperature by means of nitric acid having a concentration of 50 to 70 percent by weight and subsequent isolation of N₂O₄ by compression of the gas mixture and cooling, the improvement which comprises compressing the gas mixture to a pressure of at least 4 atmospheres absolute and cooling to a temperature not below 8° C. withdrawing part of the NO₂ as liquid N₂O₄, supplementing the oxygen content of the gas mixture containing the residual NO₂ in the gas phase by admixing air until the mixture has an oxygen content which at least corresponds to the amount stoichiometrically required for the formation of N₂O₅ from NO₂, treating the resulting gas mixture with dilute nitric acid originating from the nitric acid oxidation, with concentration of the acid, until a nitric acid of 55 to 70 percent is obtained, and recycling at least a part of the resulting concentrated acid to the oxidation stage.

2. A process according to claim 1 in which the gas mixture is compressed to a pressure of 6 to 10 atmospheres absolute and cooled to a temperature of 15°to 30° C.

3. A process according to claim 1 in which, in order to remove residual amounts of NO in the gas mixture containing NO₂, the latter is, after compression but still before cooling, allowed to continue to react in the presence of air added before the compression.

4. A process according to claim 1 in which, when carrying out the process continuously, water which accumulates is removed by withdrawing, during the oxidation of the NO by means of nitric acid, a nitric acid of a concentration which lies between that of the concentrated nitric acid employed and the dilute nitric acid arising after the oxidation.